(12) United States Patent
Simeth

(10) Patent No.: US 9,499,323 B2
(45) Date of Patent: Nov. 22, 2016

(54) PACKAGED ARTICLE ARRANGEMENT

(71) Applicant: Braun GmbH, Kronberg (DE)

(72) Inventor: Martin Simeth, Koenigstein (DE)

(73) Assignee: Braun GmbH, Kronberg (DE)

( * ) Notice: Subject to any disclaimer, the term of this patent is extended or adjusted under 35 U.S.C. 154(b) by 390 days.

(21) Appl. No.: 14/154,233

(22) Filed: Jan. 14, 2014

(65) Prior Publication Data

US 2014/0210280 A1    Jul. 31, 2014

(30) Foreign Application Priority Data

Jan. 29, 2013    (EP) .................................... 13153121

(51) Int. Cl.
| | | |
|---|---|---|
| *B65D 79/02* | (2006.01) | |
| *B65D 85/68* | (2006.01) | |
| *H02J 17/00* | (2006.01) | |

(52) U.S. Cl.
CPC .............. *B65D 79/02* (2013.01); *B65D 85/68* (2013.01); *H02J 17/00* (2013.01); *B65D 2203/12* (2013.01)

(58) Field of Classification Search
CPC ...................................................... H02J 5/005
USPC ................................................. 307/104, 149
See application file for complete search history.

(56) References Cited

U.S. PATENT DOCUMENTS

| | | | | |
|---|---|---|---|---|
| 5,923,544 | A | * 7/1999 | Urano | ..................... H02J 7/025 307/104 |
| 6,011,489 | A | 1/2000 | Ki et al. | |
| 2012/0262093 | A1* | 10/2012 | Recker | ............... H05B 33/0854 315/308 |

FOREIGN PATENT DOCUMENTS

| | | |
|---|---|---|
| DE | 000020207139 U1 | 9/2002 |
| DE | 102004019572 A | 11/2005 |
| DE | 102006057644 A1 | 6/2008 |
| DE | 102007036835 A1 | 2/2009 |
| DE | 202008014663 U1 | 2/2009 |
| DE | 102008056927 A1 | 6/2009 |
| DE | 102008024184 A1 | 12/2009 |
| EP | 1870980 A2 | 12/2007 |
| EP | 1870981 A2 | 12/2007 |
| FR | 2 954 812 A1 | 1/2011 |
| WO | WO2008155039 A1 | 12/2008 |
| WO | WO2009033662 A1 | 3/2009 |

OTHER PUBLICATIONS

European Search Report for 13153121.2 dated Jun. 12, 2013.

* cited by examiner

*Primary Examiner* — Robert Deberadinis
(74) *Attorney, Agent, or Firm* — Alexandra S. Anoff

(57) ABSTRACT

A packaged article arrangement is disclosed. The arrangement includes an article including an article energy source and an article transmitter unit for transmitting electromagnetic radiation; and a package that at least partly envelopes the article. The package includes an electronic circuit that includes a package receiver unit arranged for receiving the electromagnetic radiation transmitted by the article transmitter unit, the electronic circuit being arranged for using the received electromagnetic radiation as sole or additional power supply.

17 Claims, 3 Drawing Sheets

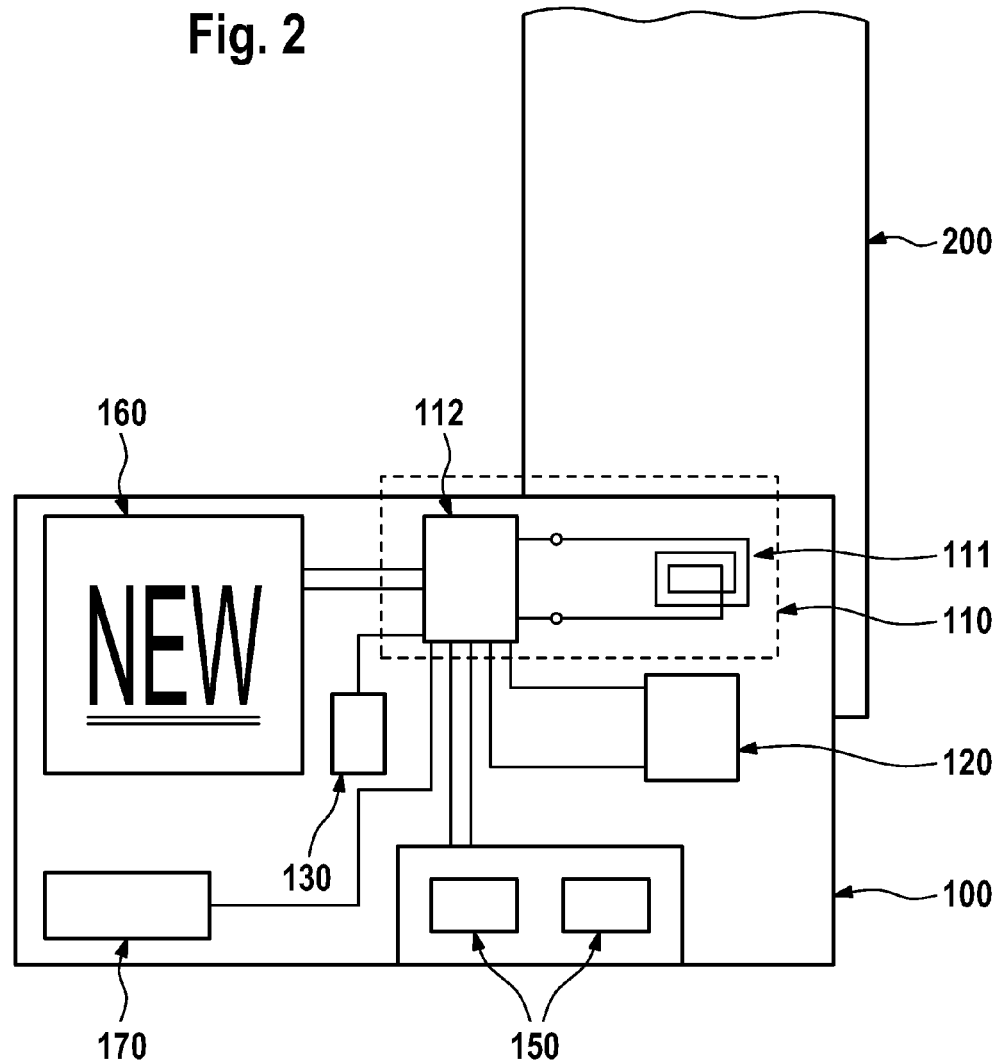

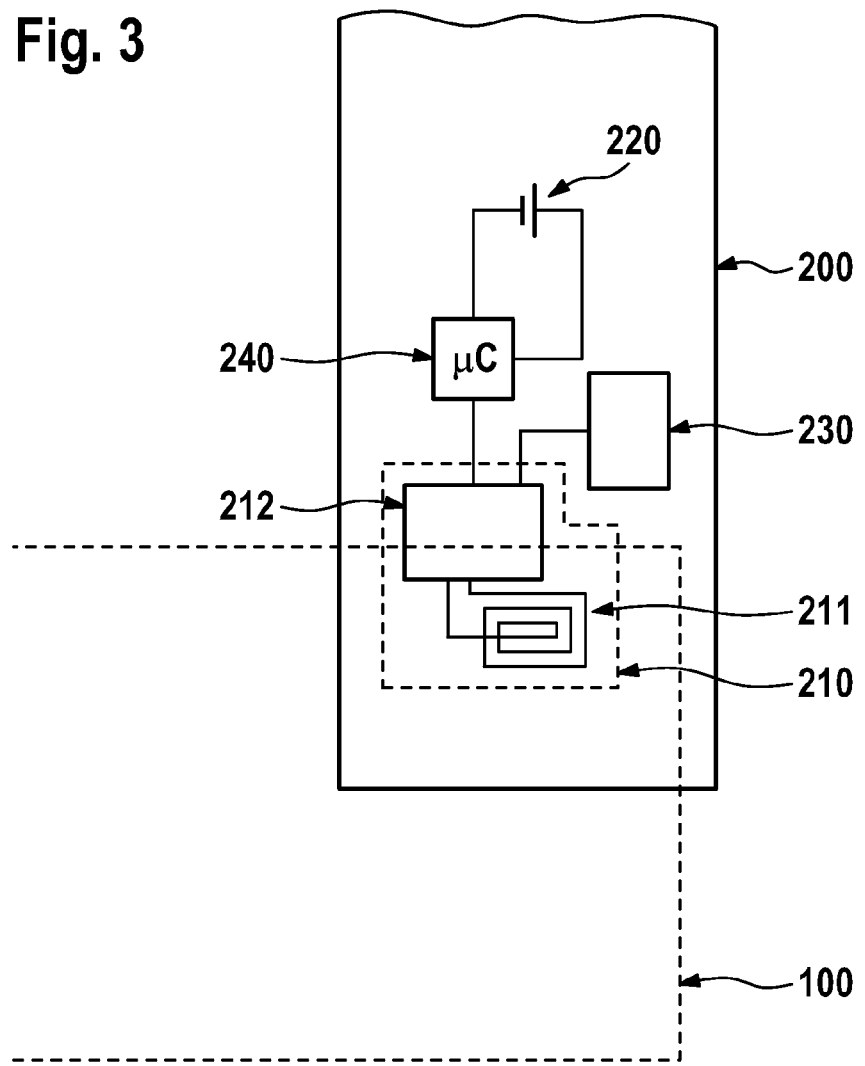

PACKAGED ARTICLE ARRANGEMENT

FIELD OF THE INVENTION

The present disclosure is concerned with a packaged article arrangement comprising an article and a package. More particularly, the present disclosure relates to a packaged article arrangement where the package is equipped with an electronic circuit.

BACKGROUND OF THE INVENTION

Packaged article arrangements comprising an article and a package having an electronic circuit are known. Prior art documents describe e.g. that the electronic circuit could be realized as an RFID chip for tracking purposes.

A packaging foil for packaging goods, which packaging foil comprises a multi-layer flexible foil body, where a plurality of layers of a decorative layer system form an electronically controlled display element, by the activation of which optically recognizable information becomes visible is known. It is also known to provide the foil body with an antenna for receiving an alternating electromagnetic field. WO 2009/033662 A1 is a document that is generally concerned with such a packaging foil.

It is a desire to provide a packaged article arrangement that is improved over the known packaged article arrangements.

SUMMARY OF THE INVENTION

In accordance with an aspect, a packaged article arrangement is provided that has an article having an article energy source and an article transmitter unit for transmitting electromagnetic radiation, a package that at least partly envelopes the article, wherein the package comprises an electronic circuit that comprises a package receiver unit arranged for receiving the electromagnetic radiation transmitted by the article transmitter unit, the electronic circuit being arranged for using the received electromagnetic radiation as sole or additional power supply.

In accordance with another aspect, a method of supplying energy to an electronic circuit is provided, which method has the steps of providing a package having an electronic circuit that has a package receiver unit, providing an article having an energy source and an article transmitter unit, which article is at least partially housed by the package in the packaged state, packaging the article in the package, transmitting electromagnetic radiation by activating the article transmitter unit, receiving the transmitted electromagnetic radiation by the package receiver unit, using the received electromagnetic radiation to solely or additionally power the electronic circuit.

These and other features, aspects and advantages of specific embodiments will become evident to those skilled in the art from a reading of the present disclosure.

BRIEF DESCRIPTION OF THE DRAWINGS

The embodiments set forth in the drawings are illustrative in nature and not intended to limit the invention defined by the claims. The following detailed description of the illustrative embodiments can be understood when read in conjunction with the following drawings, where like structure is indicated with like reference numerals and in which:

FIG. 2 shows a schematic depiction of an exemplary embodiment of the electronic circuit, and FIG. 3 shows a schematic depiction of an exemplary embodiment of the article.

DETAILED DESCRIPTION OF THE INVENTION

Figure 1:
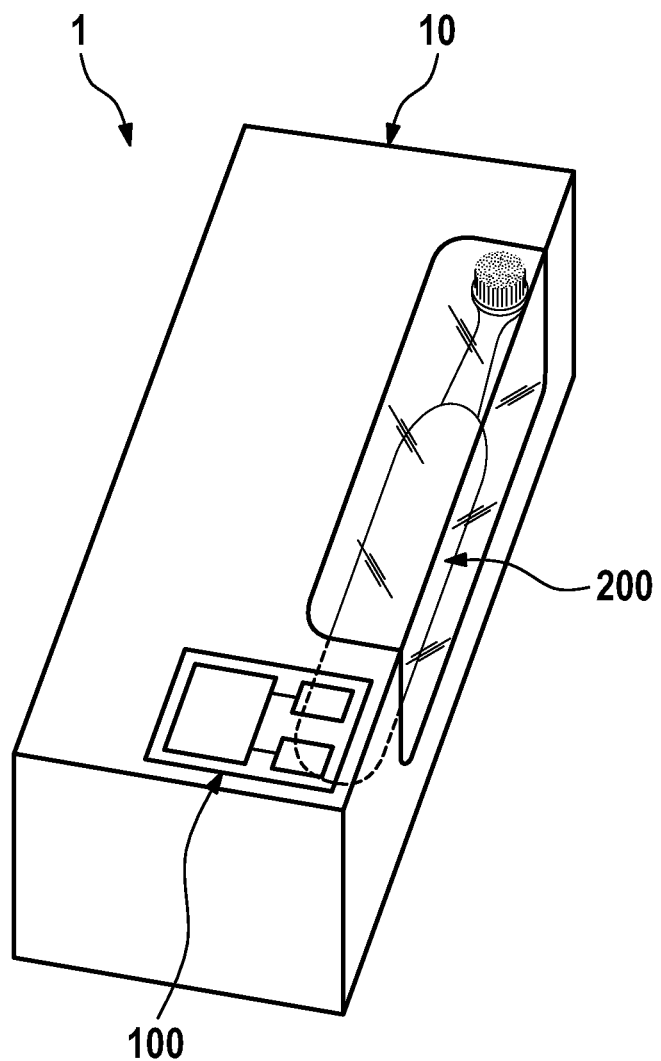
FIG. 1 shows an exemplary packaged article arrangement having a package with an electronic circuit and an article that is realized as an electric toothbrush.

The following text sets forth a broad description of numerous different embodiments of the present disclosure. The description is to be construed as exemplary only and does not describe every possible embodiment since describing every possible embodiment would be impractical, if not impossible. It will be understood that any feature, characteristic, component, composition, ingredient, product, step or methodology described herein can be deleted, combined with or substituted for, in whole or part, any other feature, characteristic, component, composition, ingredient, product, step or methodology described herein. Numerous alternative embodiments could be implemented, using either current technology or technology developed after the filing date of this patent, which would still fall within the scope of the claims. All publications and patents cited herein are incorporated herein by reference.

According to the present disclosure, a packaged article arrangement is provided. In one embodiment, the article that is at least partly enveloped by the package powers an electronic circuit by transmitting electromagnetic radiation via an article transmitter (which, in some embodiments, may be realized as a part of an article transceiver) that is received by a package receiver (which, in some embodiments, may be realized as a part of a package transceiver) being part of the electronic circuit. Thus, with no or only a small energy source, the electronic circuit included in the package can be energized by the packaged article itself, which article may comprise a (much) larger energy source such as a rechargeable accumulator or a battery. Such a packaged article arrangement allows e.g. for periodically flashing a (printed) LED being part of the electronic circuit and thus to enhance the functionality of the package. The package may then attract the attention of consumers by its periodically flashing LED.

In some embodiments, the electronic circuit may include at least one or a combination of the following additional components, namely a control unit for controlling the electronic circuit, an energy storage unit, a package data storage unit, a display unit, a user interaction interface, or a sensor unit, in particular for sensing one or more environmental parameters. In some embodiments, the electronic circuit is at least partly realized by printed electronics (i.e. a printed circuit).

In some embodiments, the packaged article arrangement may have a packaged operation mode in which the article is arranged to at least provide electromagnetic radiation by at least once in a while, periodically or constantly activating the article transmitter and/or a sleep mode in which the packaged article is arranged to stay until it receives a wake-up signal and/or a shelf mode in which the packaged article arrangement is arranged to provide once in a while, periodically or constantly (at least for a certain, potentially preset time period) an audible, visual and/or tangible signal via the electronic circuit. In some embodiments, the packaged article arrangement may be arranged to periodically activate the electronic circuit when it is either in the packaged mode or in the shelf mode.

In some embodiments, the packaged article is an electronic device such as an oral hygiene device (e.g. an electronic toothbrush), a personal grooming device (e.g. an electric shaver or an epilator), a household device or a hair care device.

FIG. 1 is a schematic depiction of an example embodiment of a packaged article arrangement 1 as proposed by the present disclosure. The package 10 includes an electronic circuit 100 that may be arranged at an outer surface of the package 10. The package 10 houses an article 200, that may be an electric toothbrush. The electronic circuit 100 may be realized at least partly as a printed electronic circuit. Printed electronics provides for relatively simple, cheap and flexible manufacturing. Additionally or alternatively, the electronic circuit 100 may be realized at least partly by thin film technology. This should not exclude that at least parts of the electronic circuit 100 are made from regular electronic components, e.g. a PCB with SMD components.

FIG. 2 is a schematic depiction of an example embodiment of an electronic circuit 100 as proposed. The electronic circuit 100 includes a package receiver unit 110, which may include a package receiver antenna 111 and a package receiver circuit 112. The package receiver unit 110 is arranged to receive electromagnetic radiation, in particular electromagnetic radiation transmitted by the article 200. The electronic circuit 100 is arranged to use the received electromagnetic radiation as sole or additional source for powering the electronic circuit 100.

In some embodiments as shown in FIG. 2, the electronic circuit 100 may include an energy storage unit 120 for providing power to the electronic circuit 100 and alternatively or additionally for storing energy received from the electromagnetic radiation. The energy storage unit 120 may be realized as a rechargeable thin film battery such as a printed battery but any other realization known to the skilled person shall also be included. Energy received by the package receiver unit 110 can be stored in the energy storage unit 120 for later usage.

In some embodiments as shown in FIG. 2, the electronic circuit 100 may include a package data storage unit 130. The package data storage unit 130 may be realized, as one possibility, by a small flash memory for storing an identification key as is known from RFID chips or, as another possibility, by a 1 Gigabyte volatile memory that can be used to store and/or buffer data such as an advertisement video.

In some embodiments as shown in FIG. 2, the electronic circuit 100 may include a user interaction interface 150. The user interaction interface 150 may be realized as a switch element, e.g. a capacitive switch element that is activated when a user touches the switch element with a finger tip or the like. The user interaction interface may be arranged such that it allows an interested user to activate the electronic circuit 100.

In some embodiments as shown in FIG. 2, the electronic circuit 100 may include a display unit 160. The display unit 160 may be realized as at least a light emitting diode (e.g. as a printed organic light emitting diode—OLED). Additionally or alternatively, the display unit 160 may be realized as a flexible display such as a printed OLED display. The display unit 160 could be used to simply attract the attention of consumers when walking by a shelf in which the packaged article arrangement is displayed. E.g. the electronic circuit 100 could be arranged to periodically switch on the display unit 160 to attract consumers by a flashing light or by product information being displayed.

In some embodiment as shown in FIG. 2, the electronic circuit 100 may include a sensor unit 170. The sensor unit 170 may include at least one sensor such as a capacitive sensor that can detect proximity of a person close to the sensor, a temperature sensor, a humidity sensor, a light sensor etc.

FIG. 3 is a schematic depiction of an example embodiment of an article 200 as part of the proposed packaged article arrangement. As was shown in FIG. 1, the article 200 may be realized as an electric toothbrush, but the article could also be realized as an electric shaver, a household appliance, a hair care appliance or any other article. The article 200 includes an article transmitter unit 210, which in the shown embodiment includes an article transmitter antenna 211 and an article transmitter circuit 212. The article transmitter unit 210 is coupled to an energy source 220. The article transmitter unit 210 is arranged to transmit electromagnetic radiation in an active state, which transmission is powered by the energy source 220. In a packaged state, the article 200 and the electronic circuit 100 may be arranged such that the article transmitter unit 210 and the package receiver unit 110 are located in close proximity for high efficiency of the coupling between the article transmitter unit 210 and the package receiver unit 110. The coupling may be an inductive coupling or a capacitive coupling.

In some embodiments as shown in FIG. 3, the article 200 may include an article data storage unit 230. The article data storage unit 230 may be arranged to store data that can be sent to the electronic circuit by e.g. modulating the transmitted electromagnetic radiation. The package receiver circuit could then be arranged to analyze the variations of the transmitted electromagnetic radiation in order to determine the data stream that is therewith transmitted. Transmitted data could be either stored in the package data storage unit or could be directly used for displaying information on the display unit.

In some embodiments, the electronic circuit includes a package transceiver unit and the article includes an article transceiver unit so that a bidirectional communication can be established. The package transceiver unit could then be arranged to provide the function of the package receiver unit but also to provide the function of a package transmitter unit. The package transceiver unit and additionally or alternatively the article transceiver unit could be realized by a receiver unit and a transmitter unit, but also as an integrated transceiver unit. The article transceiver unit could be arranged to provide the function of the article transmitter unit but also the function of an article receiver unit. In such an embodiment, the electronic circuit could be used to transmit data to the article transceiver unit, e.g. data that is generated by the sensor unit, where the article data storage unit can be used as additional (external) memory for the electronic circuit and thus to increase the versatility of the electronic circuit or to allow using a simple electronic circuit with no or only a small package data storage unit (e.g. the package data storage unit may have a capacity between only 1 byte to, e.g., about 1 kilobyte).

In some embodiments as shown in FIG. 3, the article 200 may include a control unit 240. The control unit 240 may be realized as a microcontroller. The control unit 240 may control the actions of the article transmitter unit or the article transceiver unit. In embodiments in which the article communicates with the electronic circuit, the control unit 240 may be arranged to also control the actions of the electronic circuit by transmitting respective control commands.

First Example

In accordance with a first example, the packaged article arrangement is arranged to be in a packaged mode when being provided (e.g. at a manufacturing side). Alternatively or additionally the packaged mode could be initiated by interaction with a user interaction interface provided as part of the electronic circuit, e.g. the user interaction interface may include an on/off switch by which the packaged article arrangement can be switched between an off mode and the packaged mode. In the packaged mode, the article transmitter unit is continuously or periodically transmitting electromagnetic radiation that is received by the package receiver unit. The package receiver unit may use the received energy to directly power an application such as a display unit that may be realized as an organic light emitting diode (OLED). The OLED may be driven to flash periodically to, for example, attract consumer attention. Alternatively or additionally the received energy may be stored in an energy storage unit such as a printed battery or a thin-film battery for powering an application at a later stage.

Second Example

In accordance with a second example, the packaged article arrangement is arranged to be in a sleep mode when being provided (e.g. at a manufacturing side). In the sleep mode, the control unit may continuously or periodically check an output of the article transceiver unit or the article receiver unit for a wake-up signal. Alternatively, the energy provided by the transmitted wake-up signal could be used to initiate a wake-up phase of the control unit. The packaged article arrangement could then be activated into a shelf mode by transmitting a wake-up signal by an additional device such as an activator device that transmits the wake-up signal. Such wake up could typically happen when the packaged article arrangement is placed at a sales point. The control unit would identify that the article transceiver unit or the article receiver unit has received the wake-up signal. The control unit could then start continuously or periodically transmitting electromagnetic radiation via the article transceiver unit or the article transmitter unit to the package receiver unit or the package transceiver unit in order to power the electronic circuit. The electronic circuit may be arranged to use the energy to e.g. flash a display unit realized as at least a light emitting diode such as a printed OLED to attract the attention of consumers at the point of sale or to display information about the article on a display unit realized as a flexible display such as an OLED display array to actively inform consumers about the article, e.g. its function. The data to be displayed could be stored in the package data storage unit or it could be stored in the article data storage unit. In an embodiment, video data could be stored in the article data storage unit and the video data could be transmitted to the electronic circuit for displaying the video data.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A packaged article arrangement comprising:
   a. an article comprising:
      i. an article energy source;
      ii. an article transmitter configured to transmit electromagnetic radiation in an active state wherein the article transmitter is coupled to the article energy source;
      wherein the article is selected from the group consisting of a teeth cleaning device, a personal grooming device, a household device, a hair care device, and combinations thereof;
   b. an outer package comprising an electronic circuit wherein the electronic circuit is energized by the article and wherein the electronic circuit comprises a package receiver unit and a display unit; wherein the package receiver unit is adapted to receive the electromagnetic radiation from the article transmitter and wherein the electronic circuit is arranged for using the received electromagnetic radiation as a sole or an additional power supply;
   wherein the package at least partially envelopes the article.

2. The packaged article arrangement of claim 1 wherein the package further comprising a window and an opaque portion and wherein at least a portion of the article is visible through the window.

3. The packaged article arrange of claim 1 wherein the package completely envelopes the article.

4. The packaged article arrangement of claim 1 wherein the article is a teeth cleaning device and wherein the teeth cleaning device is an electric toothbrush.

5. The packaged article arrangement of claim 1 wherein the display unit is an LED.

6. The packaged article arrangement of claim 1 wherein the received electromagnetic radiation is the sole source power supply.

7. The packaged article arrangement of claim 1 wherein the electronic circuit further comprises a package energy storage unit and wherein the article energy source has substantially more energy than the package energy storage unit.

8. The packaged article arrangement of claim 1 wherein the electronic circuit comprises a printed electronic circuit.

9. The packaged article arrangement according to claim 1, wherein the article is arranged to activate the electronic circuit periodically.

10. The packaged article arrangement according to claim 1, wherein the article has a sleep mode in which the article is arranged to stay until the article receives a wake-up signal.

11. The packaged article arrangement according to claim 1, wherein the article has a shelf mode in which the article is arranged to provide a visual, audible and/or tactile signal via the electronic circuit.

12. The packaged article arrangement according to claim 1, wherein the article comprises a control unit arranged for controlling the electronic circuit.

13. The packaged article arrangement according to claim 1, wherein the electronic circuit comprises a sensor unit.

14. A packaged article arrangement comprising:
  a. an article comprising:
    i. an article energy source;
    ii. an article transmitter configured to transmit electromagnetic radiation in an active state wherein the article transmitter is coupled to the article energy source;
    wherein the article is an electric toothbrush;
  b. an outer package comprising
    i. a window and an opaque portion and wherein at least a portion of the article is visible through the window;
    ii. an electronic circuit wherein the electronic circuit is energized by the article and wherein the electronic circuit comprises a package receiver unit and a display unit; wherein the package receiver unit is adapted to receive the electromagnetic radiation from the article transmitter and wherein the electronic circuit is arranged for using the received electromagnetic radiation as a sole power supply;
    wherein the package completely envelopes the article.

15. The packaged article arrangement of claim 14 wherein the display unit is an LED.

16. The packaged article arrangement of claim 15 wherein LED flashes.

17. The packaged article arrangement of claim 14 wherein the electronic circuit further comprises a package energy storage unit and wherein the article energy source has substantially more energy than the package energy storage unit.

* * * * *